United States Patent [19]

Brown et al.

[11] 4,311,948

[45] Jan. 19, 1982

[54] DYNAMIC BRAKING OF A.C. MOTORS

[75] Inventors: Joseph E. Brown, Newcastle-upon-Tyne; Charles R. Gamble, Shepshed, both of England; Frank Norman, St. Catherines, Canada

[73] Assignee: National Research Development Corporation, London, England

[21] Appl. No.: 26,236

[22] Filed: Apr. 2, 1979

[51] Int. Cl.³ .......................... H02P 3/18; H02P 7/04
[52] U.S. Cl. .................................... 318/759; 318/757
[58] Field of Search ............... 318/757, 759, 758, 764

[56] References Cited

U.S. PATENT DOCUMENTS

| | | | |
|---|---|---|---|
| 2,973,467 | 2/1961 | Choudhury et al. | 318/759 |
| 3,153,182 | 10/1964 | Choudhury | 318/759 |
| 4,181,197 | 1/1980 | Tanabe et al. | 318/758 X |
| 4,215,304 | 7/1980 | D'Atre et al. | 318/758 |

FOREIGN PATENT DOCUMENTS

2620346 11/1977 Fed. Rep. of Germany.
1231067 5/1971 United Kingdom.

*Primary Examiner*—J. V. Truhe
*Assistant Examiner*—Richard M. Moose
*Attorney, Agent, or Firm*—Cushman, Darby & Cushman

[57] ABSTRACT

A three-phase electric motor is partially braked as a result of self-excitation when the power supply is disconnected and a capacitor is connected across one of the windings. The motor is then rapidly brought to a standstill by applying a short-circuit (or connecting a relatively low impedance) across one or both of the other windings, and essential condition being that the short-circuit is initiated within a predetermined range of values of phase angle in a waveform of the self-excitation. Preferred ranges of phase angle are established for selected configurations of mechanical and electronic short-circuiting switches.

56 Claims, 10 Drawing Figures

DYNAMIC BRAKING OF A.C. MOTORS

BACKGROUND OF THE INVENTION

This invention relates to control apparatus for the dynamic braking of a three-phase or single-phase induction motor particularly in an arrangement in which on disconnection of the motor from the power supply a capacitor is connected to a pair of terminals of the primary windings such that self-excitation is produced.

It should be noted that the terms 'three-phase' and 'single-phase' are used to define only the type of supply for which a particular motor is intended without reference to the specific construction of the motor. Thus a single-phase motor will have primary windings of polyphase form and some means of phase correction, such as a capacitor, to enable operation from a single-phase supply. The polyphase windings may be arranged as for a three-phase supply, or may have their axes in quadrature. To avoid possible ambiguity, particularly as between star-connected and delta-connected motors, the terms "a pair of terminals of the primary windings" is used in this specification to refer in the context of a three-phase motor to a pair of the three terminals to which the supply is connected and in the context of a single-phase capacitor-start motor to a pair of the three terminals normally provided.

The effect of self-excitation is to produce a strong dynamic braking torque which is of short duration but sufficient to cause a significant reduction in speed. Thereafter the motor will normally coast to a standstill which is particularly undesirable either for emergency stops or for cyclic production processes in which a motor must be stopped and then reversed or restarted in the shortest time consistent with tolerable mechanical stress. Various secondary braking mechanisms, mechanical or electrical, have been proposed to eliminate coasting and it is usual to arrange that such a mechanism should take effect before the end of self-excitation. It is however difficult to provide precise control of the braking process.

SUMMARY OF THE PRESENT INVENTION

It is an object of the present invention to provide control apparatus for more consistently effective dynamic braking.

According to the invention there is provided control apparatus for the dynamic braking of an induction motor having primary windings for connection to a three-phase or single-phase power supply comprising a capacitor, switching means operative following disconnection of such a motor from a power supply to connect the capacitor across one pair of terminals of the primary windings of the motor to establish self-excitation therein and control means effective after a predetermined delay from the connection of the capacitor and following the occurrence of a selected phase reference condition in a self-excitation waveform of the motor, for obtaining a respective low impedance path across at least a second pair of terminals of the primary windings, conduction in the low impedance path across said second pair of terminals being initiated with a predetermined portion of a cycle of the self-excitation waveform, the motor thereby undergoing initial braking when self-excitation is established and further braking on the occurrence of conduction.

The apparatus may include delay means responsive to the operation of the switching means to produce a first enabling signal after the predetermined delay and phase selection means responsive to the occurrence in an excitation waveform of a selected phase angle related to the predetermined range of values to produce a second enabling signal, the control means being operative in response to the first and second enabling signals.

The control means may include normally non-conducting switch means operative to complete each said low-impedance path respectively and trigger means operative to transmit a trigger signal to render the switch means conductive.

The trigger means may include means responsive to the first enabling signal to produce a repetitive trigger signal and means responsive to the second enabling signal to transmit the trigger signal to each normally non-conducting switch means.

The phase-selection means may include means responsive to a parameter of the capacitor current waveform or of a voltage waveform and may include a phase shift network.

The normally non-conducting switch means may be unidirectional (typically a thyristor) or bi-directional (typically a contactor which may be controlled by electronic means) and may be connected across one or each of the pairs of terminals of the primary windings which is not connected to the capacitor.

The predetermined ranges of values of phase angle are specific to the switch configuration and manner of operation and preferred values may be determined, for example with respect to zero-crossings in the capacitor current waveform, for each case.

Preferably when two switches across respective windings are caused to conduct simultaneously and the arrangement is such that a low-impedance path is thereby completed across the capacitor, conduction should be initiated close to a zero-crossing in the waveform of capacitor voltage to avoid damage to the capacitor and to the switches.

The control means may be energised from the main power supply or from an auxiliary power supply derived from a self-excitation voltage.

The present invention is based on an appreciation that it is not sufficient that a short-circuit or similar low-impedance path should be initiated randomly during a stage of the self-excitation sequence determined by a delay device. In general it is considered that the conditions for braking which is reliably and repeatedly effective can be defined in terms of the relationship between the time at which the short-circuit is initiated and the value of a parameter of the self-excitation function at that time. It is convenient to refer timings to the zero crossings of the waveform of excitation current flowing in the capacitor, but it will be understood that the process by which a switch is operated to provide a short-circuit may be initiated by reference to other self-excitation parameters. Both the process of initiation and the phase angle at which the short-circuit should occur must be determined in dependence on the configuration of short-circuit switching to be used. In particular these requirements apply to the use of unidirectional switches such as thyristors which are the most probable choice.

It is found that for each thyristor configuration the most favourable initiation condition exists in only one quadrant of the self-excitation waveform and is then limited to a small sector of that quadrant. This sector always follows a sign change in the related voltage waveform such that a trigger signal can be applied in advance of the sign-change to obtain a low impedance path and await the favourable condition. The process will be referred to in this specification as 'lie-in-wait' triggering. A further constraint must be applied in the case where two windings are to be individually and simultaneously short-circuited so that the capacitor is also short-circuited. In order to avoid damage to the capacitor and to the switches this condition should only occur when the capacitor voltage is low and preferably close to zero.

The importance of the correct choice of the range of phase angle lies in the fact that, in general, once a short-circuit is applied during a part of the cycle in which braking is ineffective the dynamic braking capability of the machine has been dissipated and the continued presence of the short-circuit means later in the cycle will have no effect. Since for a configuration employing a single thyristor the preferred range of phase-angle within a cycle may be as little as 15° the probability of effective braking by switching without regard to phase is proportionately small. In order to provide the necessary phase discrimination in the control system, the use of electronic switching is preferred. Electromechanical means may be satisfactory if the response is sufficiently rapid and consistent and particularly if the electromechanical switch is controlled by an electronic switch.

The length of the initial delay which is desirable is related to the self-excitation behaviour of the machine. It is known that during self-excitation the reactance of the external capacitor must be substantially equal to the total inductive reactance of the machine as seen from the terminals to which the capacitor is connected and the total apparent resistance of the machine as seen from the same terminals must be substantially zero. These conditions are continuously accommodated by changes in the magnetic state of the machine as the speed falls until self-excitation can no longer be sustained. The relationships involved are not readily calculable and the value of capacitor to be most effective for a particular machine is best determined by experiment. Typically, for a suitable value of capacitor, excitation builds up (as indicated by the self-excitation voltage) within two or three cycles to a level which would be maintained if the machine were driven by a load and then declines over a few tens of cycles. Assuming an initial frequency somewhat lower than the normal supply frequency experiance indicates that the minimum initial delay should be made at least equal to the build-up time. For a 50 Hz supply, a minimum delay in the range 75 to 100 ms would be appropriate with a maximum in the region of 400 ms. In general, braking occurs less abruptly as the delay period is extended.

The control of a dynamic braking process therefore requires provision for a delay period after connection of the capacitor to enable self-excitation to be properly established followed by the selection of a favourable instant in a self-excitation cycle at which to apply a short-circuit. It will be apparent that on disconnection of the motor from the supply no appreciable reduction in speed will occur immediately so that if desired a delay may be allowed between disconnection of the supply and connection of the capacitor.

BRIEF DESCRIPTION OF THE DRAWINGS

An embodiment of the invention and its mode of operation will be described with reference to the accompanying drawings in which:

FIG. 7 (a to d) represent alternative switch configurations for use in the circuits of FIGS. 2 and 3.

DETAILED DESCRIPTION OF THE PREFERRED EMBODIMENTS

Figure 1:
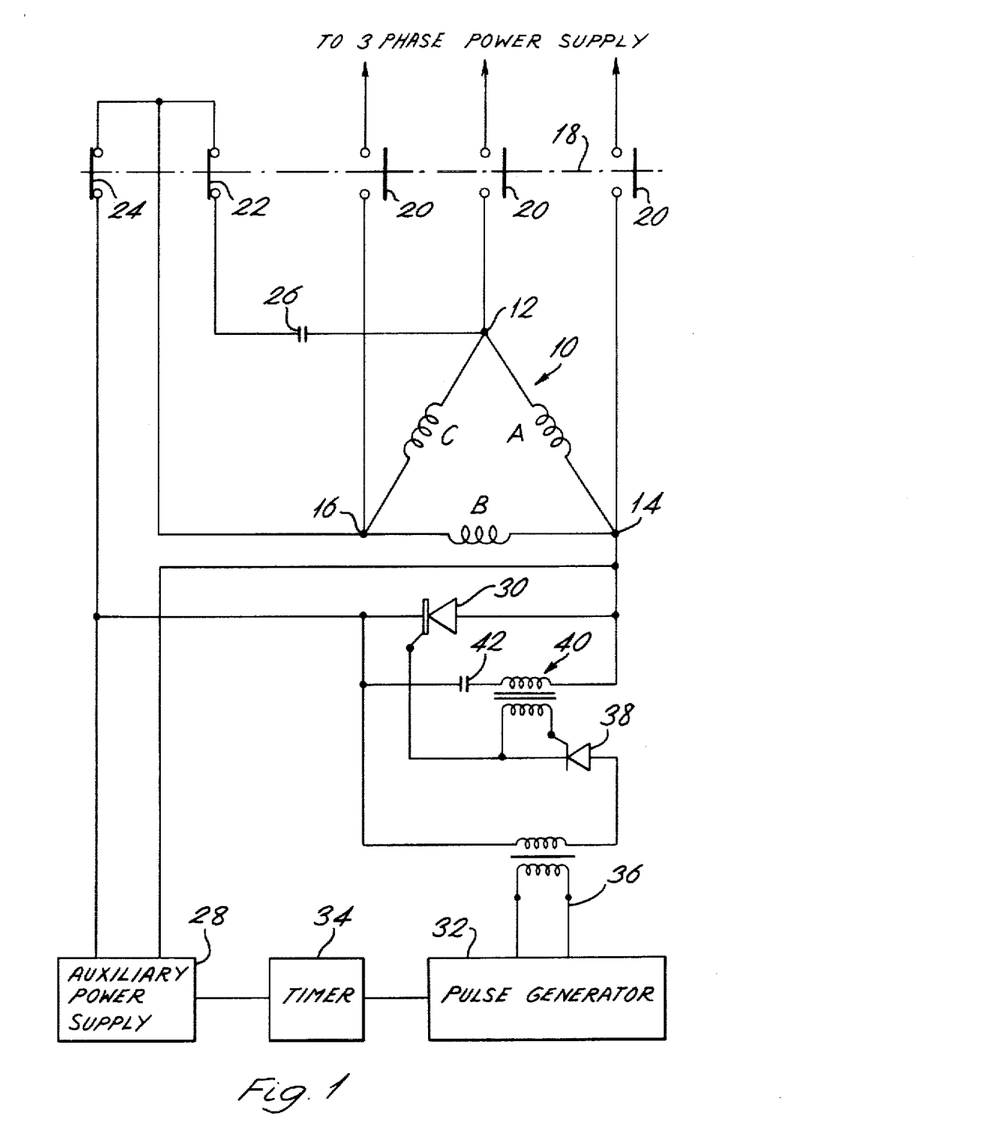
FIG. 1 represents diagrammatically a three-phase motor with a control circuit in accordance with the invention.

With reference to FIG. 1 a stator 10 is shown for a three-phase induction motor having delta-connected primary windings A, B and C connected between pairs of terminals (12,14), (14, 16) and (16, 12) respectively. The following description would apply equally to a star-connected winding. The windings A, B, C, are connected for energisation via a contactor 18 in the phase sequence 12, 14, 16. The contactor 18 includes a pair of normally-open contacts 20 in each phase of the supply and two pairs of normally-closed contacts 22 and 24. One contact of the pair 22 is connected direct to the terminal 16 and the other via a capacitor 26 to the terminal 12. When the motor is running contacts 22 and 24 are held open but the contactor 18 is so arranged that, immediately after the supply is disconnected, contacts 22 and 24 close. Via contact pair 22, capacitor 26 is thus connected across the winding C. The value of capacitor 26 as has been explained can best be determined by experiment but a value in $\mu F$ equal to $15 \times 10^3 \times$ Rated Curent/Rated Voltage has been found to be satisfactory for a three-phase motor.

The closing of contact pair 24 causes an auxiliary power unit 28 to be connected across winding B so that the control circuit becomes independent of mains power. The second stage of the mode of braking which is to be demonstrated now requires a switch to be connected across one of the windings A, B. The closing of contact pair 24 is therefore also arranged to connect a thyristor 30 across winding B, the direction of connection shown being that for which thyristor 30 conducts only during positive half-cycles in winding B, i.e. when terminal 14 is positive relative to terminal 16.

Figure 2:
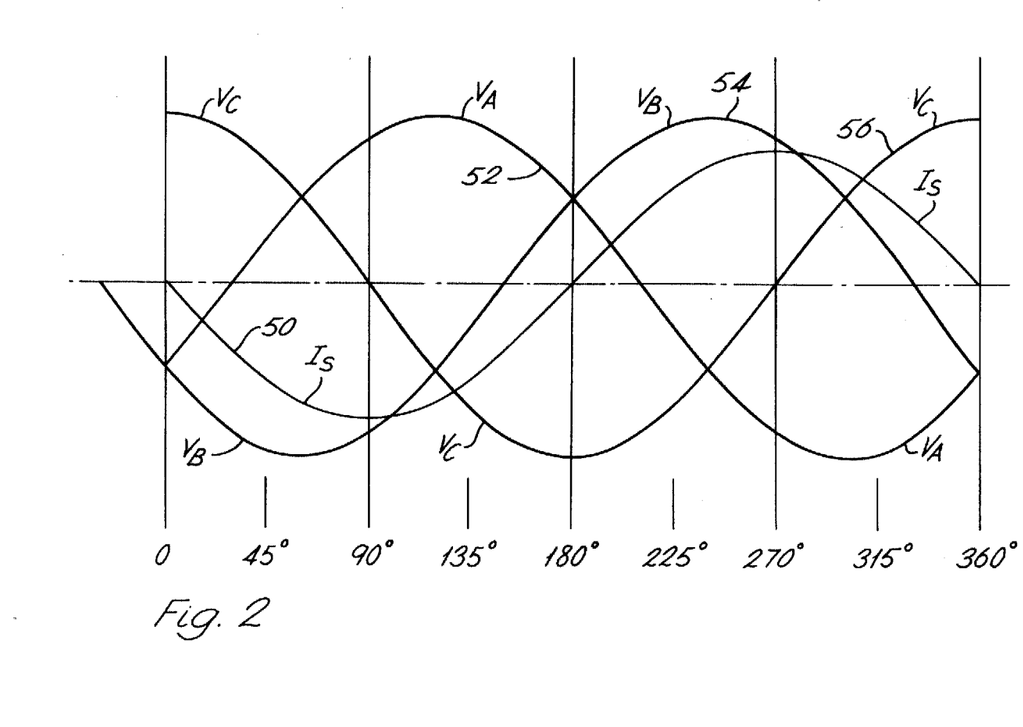
FIG. 2 illustrates the operation of the control circuit of FIG. 1 by means of representative waveforms.

Referring now to FIG. 2 idealised waveforms of arbitrary amplitude are illustrated for the self-excitation current $I_s$ (curve 50) in the path which includes capacitor 26 and the voltages $V_A$, $V_B$ and $V_C$ (curves 52, 54, 56 respectively) on the corresponding windings A, B, C. The scale represents electrical degrees and a zero value of Is, preceding a negative half-cycle, is taken as the origin. It has been established experimentally by the inventors that for a bi-directional switch across winding B the most effective braking results from closing the switch, to obtain a low impedance path therethrough, within the quarter-cycle or quadrant preceding those points where Is=o at 180° and 360°. Braking is not uniformly effective within these ranges and for the lower range the preferred region is that between 60° and 15° before current zero. The effective sector may alternatively be identified as embracing the zero crossing of VB. In the second quadrant this region is from 120° to 165°. When, however, thyristor 30 is employed as the switch, conduction only begins at 150° where VB goes positive. In this instance therefore the preferred region is limited to a period of 15° from 150° to 165° and thyristor 30 must receive a trigger signal during this time. Conveniently, since thyristor 30 cannot conduct during the preceding half-cycle in VB a trigger signal can be applied at any time after −30° to 'lie in wait' for the positive going zero-crossing of $V_B$ at 150°.

Referring again to FIG. 1 the trigger signal is derived from a pulse generator 32 controlled by a timer 34, the generator 32 and the timer 34 being supplied by the auxiliary power unit 28. On the initiation of braking, unit 28 is energised by winding B and causes timer 34 to start a predetermined running period equal to the required initial delay. At the end of this period the pulse generator 32 is switched on by timer 34 to produce a train of pulses at a frequency very much higher than the frequency of self-excitation, 15 KHz being suitable. The pulse train is fed to the trigger electrode of thyristor 30 through a pulse transformer 36 and a thyristor 38 which is in turn triggered by the secondary voltage of transformer 40. The primary winding of transformer 40 in series with a capacitor 42 is connected across thyristor 30 and consequently, when contact pair 24 is closed, across winding B. Transformer 40 and capacitor 42 thus form a phase shift network which functions as a phase-selector with respect to the phase of waveform $V_B$. The value of capacitor 42 will therefore govern the period during which thyristor 38 conducts to enable trigger pulses to reach thyristor 30 to obtain a low impedance path therethrough. The phase-shift network is adjusted so that trigger pulses are applied from a point subsequent to −30° to a point within the desired range of 150° to 165° where thyristor 30 becomes conducting.

Figure 3:
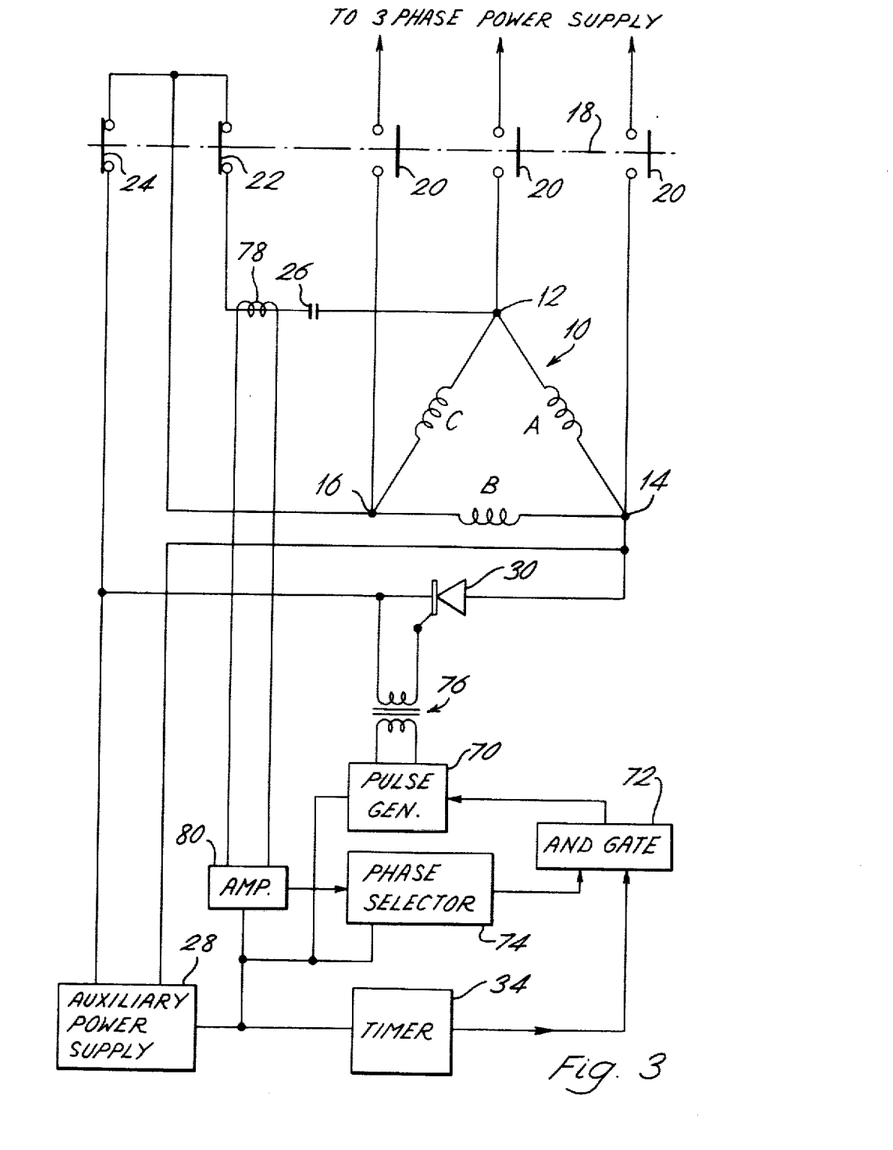
FIG. 3 represents a three-phase motor having an alternative form of control circuit in accordance with the invention.

Referring to FIG. 3 an alternative form of control apparatus is shown in which phase information is derived directly from the self-excited current. A three-phase motor 10 is shown with supply and switch arrangements identical to those of FIG. 1 as indicated by common reference numbering. On disconnection of the main supply via contactor 18 a capacitor 26 is connected across terminals 12, 16 of winding C and an auxiliary power unit 28 for the control circuit is energised from winding B. A thyristor 30 is also connected across winding B. As before the control circuit includes a timer 34 which introduces a delay sufficient to allow self-excitation to be fully established and thereafter produces an output signal for switching on a pulse generator 70. The signal is transmitted via an AND gate 72. A second input is required to open gate 72 and is derived from a phase-angle selector 74. When gate 72 is open pulses from generator 70 are applied via a pulse transformer 76 to the trigger electrode of thyristor 30. In the manner of operation explained for the circuit of FIG. 1 with reference to FIG. 2, thyristor 30 must be triggered within the range of phase angle from 150° to 165°; in the circuit of FIG. 3 the precise point of triggering within this range is determined by the phase-angle selector 74. The input to selector 74 is derived via an amplifier 80 from a current transformer 78 in the self-excitation circuit and therefore provides information on the phase of self-excitation current at any instant. Selector 74 comprises a peak detector arranged to produce a pulse when the current waveform passes through a negative peak, followed by delay means such that the pulse is passed to gate 72 at the desired point in the excitation current cycle. Alternatively, other points of the cycle could be detected, in response for example to a zero-crossing or to a specific gradient, and an appropriate delay provided.

Referring again to FIG. 2, it was stated earlier that for a bidirectional switch across winding B a further region of effective braking was found for a short-circuit occurring before the current zero point at 360° but this region proves not to be reliably effective for a unidirectional switch conducting in the direction shown for thyristor 30.

A complementary mode of operation is however available if the polarity of thyristor 30 in FIG. 1 or FIG. 3 is reversed when the region 330° to 345° with $V_B$ negative-going permits 'lie-in-wait' triggering.

In this case there is no reliably effective braking region in the second quadrant, each thyristor configuration having a preferred range of operation in a single quadrant.

On replacing thyristor 30 by a bi-directional switch, the second and fourth quadrants and particularly the ranges 120° to 165° and 300° and 345° become available with delayed triggering. In this case a heavy duty electromechanical switch may be preferred; precision of timing is then maintained by the use of electronic means to control the actuating current of the switch with an appropriate allowance for the delay in response of the switch.

As an alternative to the use of thyristor 30 connected across winding B, a short-circuit can be introduced across winding A by means of a unidirectional electronic switch such as a thyristor or by means of a bi-directional switch. A similar analysis to that discussed in relation to winding B can be applied with respect to the voltage variation $V_A$ on winding A. The experimental basis in this case is that in general the most effective braking occurs, for a bi-directional switch, when a short-circuit is applied in the quadrant following each zero-crossing in Is (curve 50 of FIG. 2). (To recall the effect of short-circuiting winding B, the most effective regions then occurred in the quadrant preceding each zero-crossing in the Is curve.) More specifically it is considered that, for a bi-directional switch, the desirable operation regions lie between 15° and 60°, and between 195° and 240°. These regions embrace the zero crossings of $V_A$. For uni-directional switches parts of these regions are preferred according to the relative polarities of the switch and the winding. Thus for a thyristor having its positive terminal connected to terminal 12 of winding A conduction can be initiated only during the positive half-cycle of curve $V_A$ and reliably effective braking is limited to the range 30° to 60°; in the reverse sense the complementary range 210° to 240° applies. As with winding B, each region allows the use of 'line-in-wait' triggering. It will be seen that the preferred regions for winding A lie in the quadrants which were not reliably useful for winding B.

Figure 4:
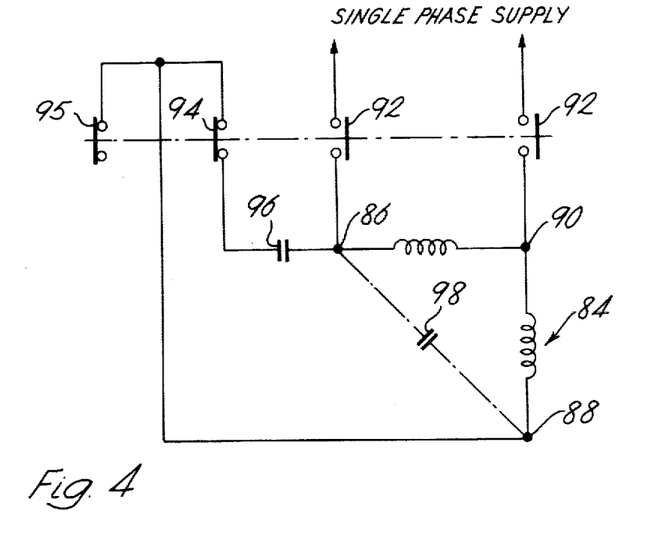
FIG. 4 represents a single-phase motor having a control circuit in accordance with the invention.

It is also of practical importance that a control system in any of the forms so far described can be applied to the dynamic braking of machines having primary windings arranged for operation with quadrature (or lesser) phase displacement from a single-phase supply. The only limitation over the three-phase winding is that the self-excitation capacitor must be connected between a predetermined pair of the primary winding terminals. With reference to FIG. 4 a quadrature wound motor 84 is shown together with the immediately associated switching arrangement for connection to the control circuits of FIG. 1 or FIG. 3. Two primary windings have independent terminals 86 and 88 and a common terminal 90. A single-phase main power supply is connected to terminals 86, 90 via contactor contacts 92. When the supply is disconnected, contacts 92 open and contact 94 closes to connect a capacitor 96 across terminals 86, 88. An auxiliary power supply may be energised by the self-excitation voltage between terminals 88 (via contact 95) and 90. A dotted connection is also shown between terminals 86, 88 to indicate the position of a starting capacitor 98. After self-excitation is established the braking short-circuit may be applied to either pair of terminals 86, 90 or 88, 90.

A three-phase machine will now be considered in which switches are arranged to apply a capacitance across one pair of the primary windings and then to short-circuit both of the other pairs of terminals. It is found that the braking effect is enhanced over the effect of a single short-circuited winding provided that the short-circuits are correctly timed in relation to the phase of the excitation waveform.

Figure 5:
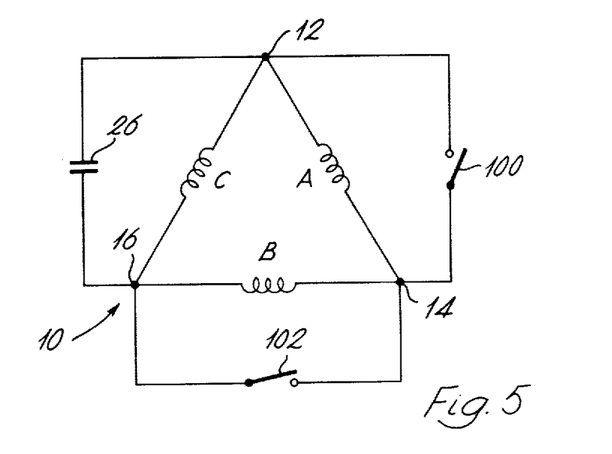
FIG. 5 represents a switch configuration for use in the circuits of FIGS. 2 or 3.

With reference to FIG. 5 a three-phase motor 10 is represented by windings A, B and C as in FIGS. 1 and 3 and capacitor 26 is shown connected across the terminals 12, 16, but the contactor 18 is not shown. Similar control arrangements to those shown in either of FIGS. 1 and 3 would be employed. A bi-directional switch 100 is connected across winding A and a similar switch 102 across winding B. It is supposed that the connection of capacitor 26 has produced self-excitation so that the waveforms in the motor windings are those shown in FIG. 6, substantially reproducing the curves 50, 52, 54, 56 of FIG. 2. One mode of braking would be to operate the switches 100 and 102 separately within the favourable regions of phase-angle identified for the individual windings in the discussion referring to FIG. 2. An alternative mode is to operate switches 100 and 102 simultaneously when effective braking is found to occur although clearly the desirable phase criteria cannot be satisfied for both windings. A criterion which can be observed, since capacitor 26 is now immediately short-circuited, is that the value of Vc (curve 56 of FIG. 6) can be chosen to be very close to zero to avoid the risk of damage both to the capacitor and to the switches. Phase angles of 90° and 270° are therefore preferred for the switch combination 100, 102.

In the arrangements of FIGS. 7 (a to d) again showing details of motor windings for use with control arrangements similar to those of FIG. 1 or FIG. 3, switches 100 and 102 of FIG. 5 are replaced by unidirectional switches. The individual and mutual properties then become significant in analysing the operation of the system. Thus in FIG. 7(a) thyristors 104 across winding A and 106 across winding B are similarly directed with positive terminals connected to terminals 12 and 14 respectively; in FIG. 7(b) thyristors 108 and 110 are similarly directed in the opposite sense to those of FIG. 7(a). In FIG. 7(c) thyristors 112 and 114 are opposed with a common positive connection to terminal 14 and in FIG. 7(d) thyristors 116 and 118 are opposed with a common negative connection to terminal 14. FIGS. 7 (a to d) will be discussed with reference to FIG. 6, the thyristors being referred to by the symbols $T_A$, $T_B$ for simplicity, the suffixes A and B referring to the corresponding windings, with the reference number added to identify the configuration.

Figure 6:
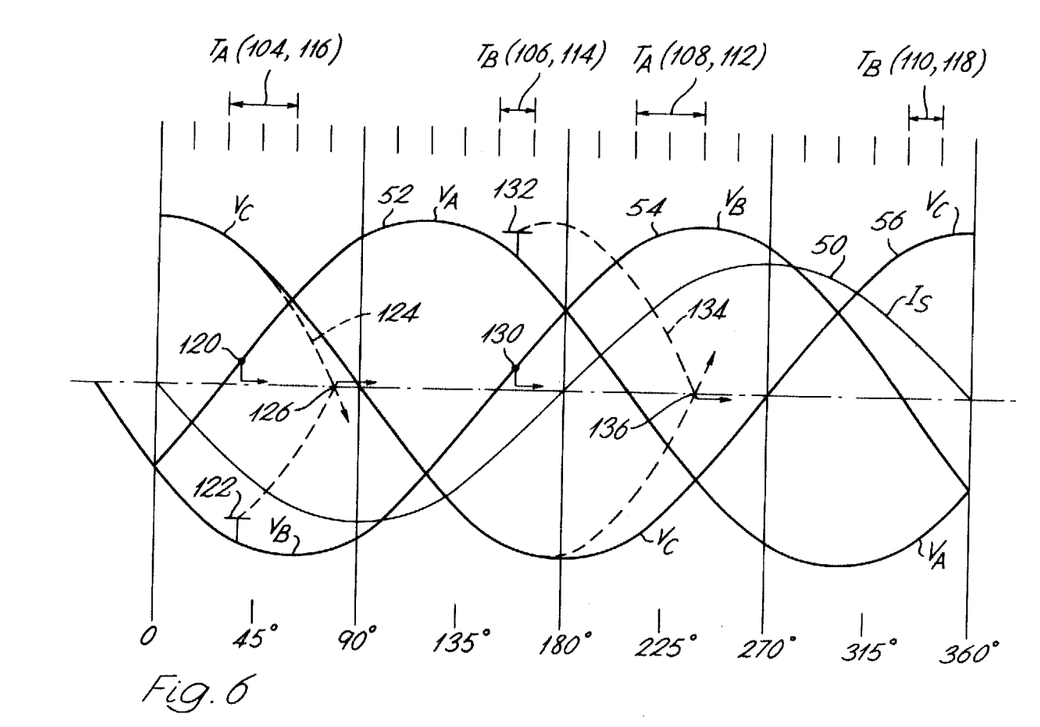
FIG. 6 illustrates the operation of various switch configurations in relation to representative waveforms.

It will be shown that conditions can be selected for the switch configurations of FIGS. 7 (a to d) which will lead to simultaneous firing of the two thyristors or which produce a distinctly sequential action. To be reliably and repeatably effective, braking with sequential action requires that at least for the first of the switches to be fired, conduction should start within the phase range which was found to be preferred for a switch in that position and of that polarity when used alone. In the preferred order of firing the thyristor having a preferred range in the earlier quadrant is the first to be triggered. From the results of the preceding discussion the scale of phase angle of FIG. 6 is marked with the preferred ranges for the relevant single thyristors. Thus the reference TA (104, 116) indicates the preferred range 30° to 60° for either of those thyristors, TB (106, 114) the preferred range 150° to 165°, TA (108, 112) the preferred range 210° to 240° and TB (110, 118) the preferred range 330° to 345°.

Figure 7A:
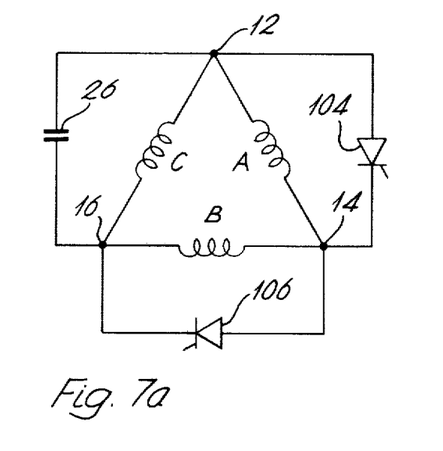

Referring to FIG. 7(a) and FIG. 6, the combination TA (104), TB (106) is required. TA (104) can be switched on in the first quadrant as soon as $V_A$ becomes positive and since $V_B$ is negative TB (106), although receiving a trigger signal, will be unaffected. Consider 'lie-in-wait' triggering to cause conduction at a point 120 on curve $V_A$. (In order to preserve clarity in the diagram, the point 120 is shown displaced slightly from its actual position close to the zero-crossing.) The value of $V_A$ then falls to a low positive level which for convenience may be considered to be zero. In order that the machine voltages should remain balanced when $V_A$ becomes zero, $V_B$ and $V_C$ must subsequently equalise with opposite sign and since $V_C$ cannot change rapidly the balance must be provided by a step change in $V_B$. Thus a step in $V_B$ to a level 122 is required. $V_C$ then continues to decay, with a possible departure from the original curve 56 suggested by the curve 124, while $V_B$ decays in mirror fashion from level 122 to a zero crossing 126. As $V_C$ continues negatively, $V_B$ becomes positive so that TB (106) also conducts. Both $V_B$ and $V_C$ then return to zero, the braking sequence then being completed.

Figure 7B:
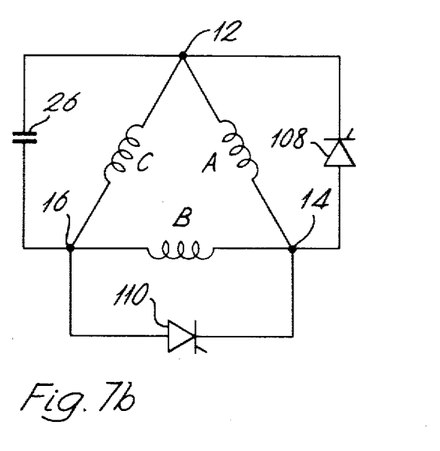

Referring to FIG. 7b and FIG. 6 it will be seen that the desirable order of firing is TA (108) followed by TB (110). TA (108) is caused to conduct in the third quadrant as soon as $V_A$ goes negative and a braking sequence closely similar to that desired for the configuration of FIG. 7A is then followed.

Since in FIG. 7a TA (104) and TB (106) conduct in the same direction, (as do TA (108) and TB (110) in FIG. 7b in the opposite sense), the capacitor 26 is short circuited as soon as both thyristors in either configuration become conducting. As described for the switches of FIG. 5, simultaneous triggering of the thyristors can also produce effective braking but in practice such action must be limited to the condition when $V_C$ is close to zero.

Figure 7C:
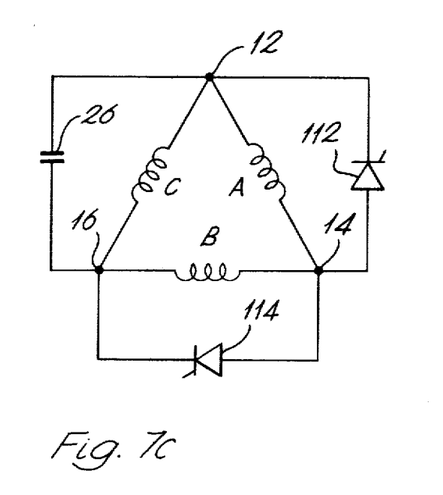

Referring to FIG. 7c, the desirable order of firing is indicated by the order of the preferred quadrants in FIG. 6 as being first TB (114) and then TA (112). Thus TB (114) should be fired at a point on curve $V_B$ within the range 150° to 165° which will correspond for 'lie-in-wait' triggering to the point 130 just after the zero-crossing. As $V_B$ falls to zero, $V_A$ rises to a level 132 and then follows a curve such as the curve 134 which tends to zero at a point 136. As soon as $V_A$ goes negative TA (112) will fire to complete the braking sequence. In practice $V_C$, and therefore also $V_A$, will approach zero at a rate dependent on the precise conditions in the machine but TA (112) is always found to fire at an instant such that effective braking results. It will be apparent that since the waveforms of FIG. 6 represent the initial uniform excitation frequency the waveform during braking is not truly indicated, there being a progressive reduction in frequency as the speed of the motor is reduced. Any estimate of the decay time of $V_C$ is therefore subject to uncertainty for this reason.

Figure 7D:
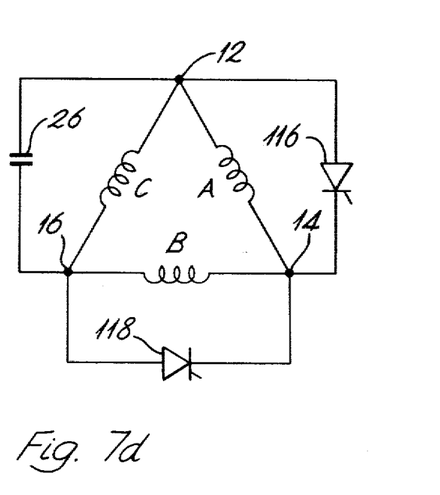

Referring to FIG. 7d, the desirable order of firing is indicated by the order of the preferred quadrants in FIG. 6 as being first TB (118) and then TA (116). In a similar manner to that described with reference to FIG. 7c, firing TB (118) within the range 330° to 345°, $V_A$ mirrors the decay of $V_C$ towards a zero crossing at a point in the first quadrant of the following cycle.

Preferred ranges of phase angle have been defined for the initiation of the short-circuit in the configurations of FIG. 7 in order to provide convenient and reliable braking. Points outside the defined ranges can be found at which braking may be produced but with varying degrees of uncertainty and no compensating advantage and in particular such points are not amenable to 'lie-in-wait' triggering. At some of these points the risk of damage to circuit components is substantial.

In this connection an aspect of the opposed polarity configuration of FIGS. 7c and 7d to be noted in comparison with the series configuration of FIGS. 7a and 7v is that the two thyristors when conducting do not represent a unidirectional current path across the capacitor 26 and so do not introduce the risk of damage if $V_C$ should be non-zero.

In using the auxiliary power supply (28) connected as shown in FIGS. 1 and 3, with any configuration of FIGS. 7 (a to d) which leads to sequential conduction in TA and TB, the power input will be cut off or rapidly reduced on the occurrence of the first short-circuit. The auxiliary power supply should therefore be designed to provide a regulated output which remains adequate with reduced input. The smoothing time constant can readily be made sufficient to cover the normal braking period after the input has fallen to zero. The auxiliary power supply may of course be connected to derive its input from windings other than the winding B to provide fail-safe braking in the event that the machine becomes completely isolated from the main power supply. In a situation where such an eventuality need not be taken into account the braking controls may be energised directly from the main supply.

Tests carried out on single-phase and three-phase induction motors with a short-circuit applied to a single winding show that dependable braking is obtained when the short-circuit is initiated within the preferred ranges of phase angle. For a 3 KW three-phase motor a 200 µF capacitor was used and with normal inertia the motor was stopped in 0.1s after little more than two revolutions. A high value of peak torque is experienced, in comparison for example with braking by normal d.c. injection when the stopping time is nine times longer. The peak torque can be reduced and the stopping time extended by lengthening the period of the initial delay but the braking effect will fail if the delay is made too long.

Control systems for 3-phase motors in which short circuits are applied to two windings, in accordance with the invention, in general provide more effective braking than when only one winding is short-circuited. An advantage may be derived in alternative ways. For example: a higher value of inertia can be accommodated; the value of capacitance can be reduced in the self-excitation stage; the period of initial excitation can be reduced and a very short overall stopping time achieved; or, the initial excitation period can be increased and the overall stopping time extended so that the peak torque is reduced.

Whereas the embodiments described in this specification have included provision for the application of a 'short-circuit' across a machine winding the general requirement will be satisfied by a path having a low but non-zero value of impedance. Selection of this value provides a further means of variation in the braking performance and therefore of the peak torque. It will be appreciated that the means by which the braking capacitor is switched across the machine winding is described in terms of a conventional type of contactor and that other means of producing such a switching action could be employed within the ambit of the invention. Similarly it is intended that means other than those described may be employed to determine the value of any parameter of the self-excitation function to which the instant of application of the winding short-circuit may advantageously be related.

We claim:

1. Control apparatus for the dynamic braking of an induction motor having primary windings of polyphase form and a plurality of pairs of terminals associated therewith, comprising:
   a capacitor;
   switching means operative subsequent to the disconnection of said motor from a power supply for connecting said capacitor across a first pair of terminals of said primary windings to establish self-excitation in said primary windings; and
   control means operative after a predetermined delay from the connection of said capacitor during which initial braking occurs, for obtaining a respective low impedance path across at least a second pair of terminals of said primary windings other than said terminals across which said capacitor is connected following the occurrence of a selected phase reference condition in a self-excitation wave form of said motor, conduction in the low impedance path across said second pair of terminals being initiated within a predetermined portion of a cycle of said self-excitation wave form to obtain further braking.

2. An apparatus according to claim 1 further comprising:
   delay means responsive to the operation of said switching means to produce a first enabling signal after said predetermined delay; and
   phase selection means responsive to the occurrence of said selected phase reference condition to produce a second enabling signal, said control means being operative in response to said first and second enabling signals.

3. An apparatus according to claim 2 in which said phase-selection means comprises a phase-shift network having a voltage input from a primary winding.

4. An apparatus according to claim 2 in which said phase-selection means includes means responsive to a parameter of the capacitor current waveform.

5. An apparatus according to claim 2 in which said phase selection means includes means for causing a predetermined delay in transmission of said second enabling signal to said control means.

6. An apparatus according to claim 1 in which said control means includes:
   normally non-conducting switch means operative to produce each respective low-impedance path; and
   trigger means operative to transmit a trigger signal to enable said normally non-conducting switch means.

7. An apparatus according to claim 6 in which said trigger means includes:
   means for producing a repetitive trigger signal; and
   means for transmitting said trigger signal to said normally non-conducting switch means.

8. An apparatus according to claim 6 in which said normally non-conducting switch means is bi-directionally conductive when conductive.

9. An apparatus according to claim 8 in which a low-impedance path is obtained across only said second pair of terminals.

10. An apparatus according to claim 9 in which said predetermined portion of a cycle comprises, within each time quadrant of said self-excitation waveform in which there occurs a zero-crossing in a voltage waveform of the winding associated with the low-impedance path obtained across said second pair of terminals, a sector which extends through approximately thirty degrees on each side of said zero-crossing.

11. An apparatus according to claim 8 in which respective low impedance paths are obtained across all respective pairs of terminals, other than said first pair of terminals, associated with respective windings of said primary windings.

12. An apparatus according to claim 11 in which said respective low-impedance paths are obtained simultaneously.

13. An apparatus according to claim 12 in which said predetermined portion of a cycle is substantially a zero crossing in a voltage waveform of said capacitor.

14. An apparatus according to claim 6 in which said normally non-conducting switch means is uni-directionally conductive when conductive.

15. An apparatus according to claim 14 in which said normally non-conducting switch means comprises a first uni-directional switch means operative such that a low-impedance path is obtained across said second pair of terminals.

16. An apparatus according to claim 15 in which said predetermined portion of a cycle lies within each time quadrant of said self-excitation waveform in which a voltage waveform of the winding associated with the low impedance path obtained across said second pair of terminals changes sign to that favorable to conduction through said switch means, said predetermined portion of a cycle comprising a sector of approximately 15° following said change of sign.

17. An apparatus according to claim 16 in which said trigger means is operative to commence transmission of said trigger signal within a half-cycle of the voltage waveform of the winding associated with the low impedance path obtained across said second pair of terminals preceding said change of sign such that 'lie-in-wait' triggering occurs to obtain conduction substantially immediately following said change of sign.

18. An apparatus according to claim 15 in which said normally non-conducting switch means further comprises a second uni-directional switch means operative in consequence of conduction in the low impedance path obtained across said second pair of terminals to obtain a low-impedance path across a third pair of terminals.

19. An apparatus according to claim 18 in which said first uni-directional switch means is operative prior to said second uni-directional switch means, said predetermined portion of a cycle occurring in an earlier time quadrant than another predetermined portion of a cycle of said self-excitation waveform associated with an initiation of a low-impedance path across said third pair of terminals absent the influence of the low impedance path obtained across said second pair of terminals.

20. An apparatus according to claim 1 in which said control means is energised from an auxiliary power supply derived from one of said primary windings during self-excitation.

21. An apparatus for dynamically braking an induction motor having primary windings of polyphase form and a plurality of terminals associated therewith, comprising:
   a capacitor;
   switch means for controlling the connection of said capacitor across one pair of self-excitation terminals to obtain initial braking of said motor;
   control means for providing a low impedance path across at least a different pair of braking control terminals; and
   means responsive to a self-excitation wave form of said motor for enabling said control means at a predetermined phase angle of said self-excitation wave form, conduction thereby being able to occur through the low impedance path provided by said control means to obtain further braking of said motor.

22. An apparatus as in claim 21 further comprising means responsive to removal of power from said motor for enabling said control means after a predetermined delay period, said control means being operative after enabled by both said phase angle enabling means and said delay period enabling means.

23. An apparatus as in claim 21 or 22, wherein said control means comprises a normally nonconductive unidirectional switching device connected across a first pair of braking control terminals, conduction therethrough ensuing, once said control means is enabled, when the level and polarity of voltage present at said first pair of braking control terminals satisfies a predetermined trigger condition.

24. An apparatus as in claim 23, wherein said self-excitation waveform is a voltage waveform of a primary winding associated with said first pair of braking control terminals, and wherein said predetermined phase angle is within a range of approximately fifteen degrees following a change in sign of said self-excitation waveform to a polarity favorable to conduction in said unidirectional switching device.

25. An apparatus as in claim 23, wherein said self-excitation waveform is a current waveform of said capacitor, and wherein said predetermined phase angle is within a time quadrant of said self-excitation waveform in which a voltage waveform of a primary winding associated with said first pair of braking control terminals changes sign to a polarity favorable to conduction in said uni-directional switching device, said predetermined phase angle being within a range of approximately fifteen degrees following said change in sign.

26. An apparatus as in claim 23, wherein said control means comprises another normally nonconductive unidirectional switching device connected across a second pair of braking control terminals, conduction therethrough ensuing subsequent to conduction through said first-mentioned unidirectional switching device when the level of voltage present at said second pair of braking control terminals satisfies a predetermined trigger condition.

27. An apparatus as in claim 23, wherein said control means further comprises:
   means for generating a periodic trigger signal; and
   means for transmitting said trigger signal to said unidirectional switching device.

28. An apparatus as in claim 21 or 22, wherein said control means comprises a normally nonconductive bidirectional switch, conduction therethrough occurring substantially simultaneously with the enabling of said control means.

29. An apparatus as in claim 28, wherein said self-excitation waveform is a voltage waveform of a primary winding associated with said first pair of braking control terminals, and wherein said predetermined phase angle is within a range of approximately thirty degrees on either side of the zero crossing of said self-excitation waveform.

30. An apparatus as in claim 29, wherein said predetermined phase angle corresponds to said zero crossing.

31. An apparatus as in claim 28, wherein said self-excitation waveform is a current waveform of said capacitor, and wherein said predetermined phase angle is within a time quadrant of said self-excitation waveform in which a voltage waveform of a primary winding associated with said first pair of braking control terminals has a zero crossing, said predetermined phase angle being within a range of approximately thirty degrees on each side of said zero crossing.

32. An apparatus as in claim 31, wherein said predetermined phase angle corresponds to said zero crossing.

33. An apparatus as in claim 28, wherein said control means comprises another normally nonconductive bidirectional switch connected across a second pair of braking control terminals, conduction therethrough being obtained substantially simultaneously with conduction through said first-mentioned bidirectional switch.

34. An apparatus as in claim 21, wherein said control means enabling means comprises a phase shift network, said self-excitation waveform being a voltage waveform of a primary winding associated with a first pair of braking control terminals.

35. An apparatus as in claim 24, wherein said control means enabling means comprises a phase shift network, said self-excitation waveform being a voltage waveform of a primary winding associated with said first pair of braking control terminals.

36. An apparatus as in claim 29, wherein said control means enabling means comprises a phase shift network, said self-excitation waveform being a voltage waveform of a primary winding associated with said first pair of braking control terminals.

37. An apparatus as in claim 21, wherein said control means enabling means comprises:
   a current transformer for sensing said self-excitation waveform, said self-excitation waveform being a current waveform of said capacitor; and
   a phase selector responsive to the output of said current sensor for enabling said control means at said predetermined phase angle.

38. An apparatus as in claim 25, wherein said control means enabling means comprises:
   a current transformer for sensing a self-excitation waveform, said self-excitation waveform being a current waveform of said capacitor; and
   a phase selector responsive to the output of said current sensor for enabling said control means at said predetermined phase angle.

39. An apparatus as in claim 31, wherein said control means enabling means comprises:
   a current transformer for sensing said self-excitation waveform, said self-excitation waveform being a current waveform of said capacitor; and
   a phase selector responsive to the output of said current sensor for enabling said control means at said predetermined phase angle.

40. A method for dynamically braking an induction motor having primary windings of polyphase form and a plurality of terminals associated therewith, comprising the steps of:
   removing power from said motor;
   establishing self-excitation in said primary windings by connecting a capacitor across one of the primary windings, subsequent to said power removal step, for obtaining initial braking of said motor; and
   enabling a low impedance path across a preselected first primary winding of said primary windings different than the one of the primary windings having a capacitor connected thereacross, subsequent to a predetermined delay period during which initial braking of said motor occurs, at a predetermined phase angle of a self-excitation wave form of said motor, conduction thereby being able to occur through the low impedance path across said first primary winding to obtain further braking of said motor.

41. A method as in claim 40, wherein conduction through the low impedance path across said first primary winding occurs when the level of voltage of said first primary winding satisfies a predetermined trigger condition.

42. A method as in claim 41 further comprising the step of enabling a low impedance path across a preselected second primary winding of said primary windings concurrent with said step of enabling a low impedance path across a preselected first primary winding, conduction occurring through the low impedance path across said second primary winding subsequently to conduction through the low impedance path across said first primary winding when the level of voltage of said second primary winding satisfies a predetermined trigger condition.

43. A method as in claim 41 further comprising the step of enabling a low impedance path across a preselected second primary winding of said primary windings, subsequent to said predetermined delay period, at another predetermined phase angle of said self-excitation waveform greater than said first-mentioned predetermined phase angle, conduction occurring through the low impedance path across said second primary winding subsequently to conduction through the low impedance path across said first primary winding when the level of voltage of said second primary winding satisfies a predetermined trigger condition.

44. A method as in claim 41, wherein said self-excitation waveform is the voltage waveform of said first primary winding, further comprising the step of enabling a low impedance path across a preselected second primary winding of said primary windings, subsequent to said predetermined delay period, at a predetermined phase angle of a voltage waveform of said second primary winding, conduction thereby occurring through the low impedance path across said second primary winding subsequently to conduction through the low impedance path across said first primary winding when the level of voltage of said second primary winding satisfies a predetermined trigger condition.

45. A method as in claim 40, wherein conduction through the low impedance path across said first primary winding occurs concurrently with said step of enabling a low impedance path across a preselected first primary winding.

46. A method as in claim 45 further comprising the step of enabling a low impedance path across a preselected second primary winding of said primary windings concurrent with said step of enabling a low impedance path across a preselected first primary winding, conduction occurring through the low impedance path across said second primary winding concurrently with conduction through the low impedance path across said first primary winding.

47. A method as in claim 45 further comprising the step of enabling a low impedance path across a preselected second primary winding of said primary windings, subsequent to said predetermined delay period, at another predetermined phase angle of said self-excitation waveform greater than said first-mentioned predetermined phase angle, conduction occurring through the low impedance path across said second primary winding subsequently to conduction through the low impedance path across said first primary winding and concurrently with the enabling of the low impedance path across said second primary winding.

48. A method as in claim 45, wherein said self-excitation waveform is the voltage waveform of said first primary winding, further comprising the step of enabling a low impedance path across a preselected second primary winding of said primary windings, subsequent to said predetermined delay period, at a predetermined phase angle of a voltage waveform of said second primary winding, conduction occurring through the low impedance path across said second primary winding subsequently to conduction through the low impedance path across said first primary winding and concurrently with the enabling of a low impedance path across said second primary winding.

49. A method as in claim 40, 41, 42, 43, 45, 46 or 47, wherein said self-excitation waveform of said motor is a self-excitation current waveform.

50. A method as in claim 40, 41, 42, 43, 45, 46 or 47, wherein said self-excitation waveform of said motor is the voltage waveform of said first primary winding.

51. A method as in claim 40, wherein said primary winding is delta-connected for connection to a three-phase supply.

52. A method as in claim 40, wherein said primary windings are star-connected for connection to a three-phase supply.

53. A method for dynamically braking an induction motor having primary windings of polyphase form and a plurality of terminals associated therewith, comprising the steps of:
removing power from said motor;
establishing self-excitation in said primary windings by connecting a capacitor across a series arrangement of a first predetermined one and a second predetermined one of said primary windings, said primary windings being connected in quadrature for connection to a single-phase supply, for obtaining initial braking of said motor; and
enabling a low impedance path across a preselected one of said primary windings, subsequent to a predetermined delay period during which initial braking of said motor occurs, at a predetermined phase angle of a self-excitation wave form of said motor conduction thereby being able to occur through the low impedance path across said first primary winding to obtain further braking of said motor.

54. A method as in claim 42, 43, 46 or 47, wherein said step of establishing self-excitation comprises the step of connecting a capacitor across a preselected third primary winding of said primary windings, said primary windings being delta-connected for connection to a three-phase supply.

55. A method as in claim 42, 43, 46 or 47 wherein said step of establishing self-excitation comprises the step of connecting a capacitor across a preselected third primary winding of said primary windings, said primary windings being star-connected for connection to a three-phase supply.

56. A method as in claim 42, 43, 46 or 47 wherein said step of establishing self-excitation comprises the step of connecting a capacitor across the series arrangement of said first and said second primary windings, said primary windings being connected in quadrature for connection to a single-phase supply.

* * * * *